US012680602B1

(12) United States Patent
Simpson

(10) Patent No.: US 12,680,602 B1
(45) Date of Patent: Jul. 14, 2026

(54) DAMPENING SYSTEM FOR A GEARBOX ON AN AIRBOAT ENGINE

(71) Applicant: SIMPSON QUALITY DESIGNS, Vero Beach, FL (US)

(72) Inventor: David W. Simpson, Vero Beach, FL (US)

(73) Assignee: Simpson Quality Designs, Inc., Vero Beach, FL (US)

( * ) Notice: Subject to any disclaimer, the term of this patent is extended or adjusted under 35 U.S.C. 154(b) by 710 days.

(21) Appl. No.: 18/161,622

(22) Filed: Jan. 30, 2023

Related U.S. Application Data

(60) Provisional application No. 63/304,262, filed on Jan. 28, 2022.

(51) Int. Cl.
    *F16H 57/028* (2012.01)
    *B63H 7/02* (2006.01)
    (Continued)

(52) U.S. Cl.
    CPC .............. *F16H 57/028* (2013.01); *B63H 7/02* (2013.01); *B63H 23/06* (2013.01); *F16D 3/12* (2013.01);
    (Continued)

(58) Field of Classification Search
    CPC ......... F16H 57/028; F16H 2057/02043; F16H 45/00; B63H 7/02; B63H 23/06;
    (Continued)

(56) References Cited

U.S. PATENT DOCUMENTS 6,234,906 B1 * 5/2001 Jordan ...................... F16D 3/76
                                                      464/92
6,508,713 B1 * 1/2003 Kaye ..................... F16F 15/124
                                                      464/83
(Continued)

FOREIGN PATENT DOCUMENTS

WO      WO-2005030575 A1 * 4/2005 ............. B63H 21/30

OTHER PUBLICATIONS

Crankshaft [online]. wikipedia.org, 2021 [archived on Dec. 28, 2021]. Retrieved from the Internet: <URL: https://web.archive.org/web/20211228233732/https://en.wikipedia.org/wiki/Crankshaft>.(Year: 2021).*

(Continued)

*Primary Examiner* — Marc Q Jimenez
*Assistant Examiner* — Eric Anthony Starck
(74) *Attorney, Agent, or Firm* — Greenberg Traurig, P.A.; Michael K. Dixon

(57) ABSTRACT

A gearbox dampening system configured to absorb axial movement of the crank of the airboat engine to reduce damage causing vibration and noise is disclosed. The gearbox dampening system enables a gearbox to be releasably coupled to outer support structures of an engine to support the gearbox and enables one or more gears of the gearbox to be in communication with a crank of an airboat engine via one or more dampeners. In at least one embodiment, the one or more dampeners significantly reduces stresses imparted on the gears of the gearbox via axial movement of the crank of the engine created when the engine is running. In particular, axial movement of the crank of the engine, which would usually create noise, chatter and engine damage, is absorbed by the dampeners positioned between the crank and the one or more gears in the gearbox supporting an airboat propeller.

20 Claims, 14 Drawing Sheets

(51) Int. Cl.
| | |
|---|---|
| *B63H 23/06* | (2006.01) |
| *F16D 3/12* | (2006.01) |
| *F16D 3/64* | (2006.01) |
| *F16F 15/124* | (2006.01) |
| *F16H 57/02* | (2012.01) |

(52) U.S. Cl.
CPC .............. *F16D 3/64* (2013.01); *F16F 15/124* (2013.01); *F16H 2057/02043* (2013.01)

(58) Field of Classification Search
CPC . B63H 20/14; B63H 3/04; B63H 9/00; G10K 11/16; F16B 19/02; F16B 21/02; F16B 21/04; F16B 31/00; F16B 31/02; F16B 31/027; F16B 39/028; F16B 5/10; F16B 21/12; F16B 2200/406; F16B 23/0015; F16B 37/00; F16B 39/02; F16B 45/02; F03D 13/10; F03D 13/25; F03D 13/40; F03D 7/0224; F03D 80/00; F03D 80/70; Y02T 50/60; F16D 3/48
USPC ......................................... 440/37; 464/71, 83
See application file for complete search history.

(56) References Cited

U.S. PATENT DOCUMENTS

| | | | | |
|---|---|---|---|---|
| 7,261,637 | B2 * | 8/2007 | Tokuoka ................... | F16D 3/48 464/138 |
| 10,415,684 | B2 * | 9/2019 | Manzoor ............... | F16H 55/566 |
| 2019/0128378 | A1 * | 5/2019 | Eakin ....................... | B63H 7/02 |

OTHER PUBLICATIONS

Transmission (mechanics) [online]. wikipedia.org, 2021 [archived on Jun. 18, 2021]. Retrieved from the Internet: <URL: https://web.archive.org/web/20210618174005/https://en.wikipedia.org/wiki/Transmission_%28mechanics%29>. (Year: 2021).*
Starter (engine) [online]. wikipedia.org, 2021 [archived on Nov. 26, 2021]. Retrieved from the Internet: <URL: https://web.archive.org/web/20211126173904/https://en.wikipedia.org/wiki/Starter_(engine)>. (Year: 2021).*

* cited by examiner

DAMPENING SYSTEM FOR A GEARBOX ON AN AIRBOAT ENGINE

CROSS-REFERENCE TO RELATED APPLICATION

This application claims the benefit of U.S. Provisional Patent Application No. 63/304,262, filed on Jan. 28, 2022, which is incorporated herein in its entirety.

FIELD OF THE INVENTION

The present application relates to airboat engines and more particularly to gearboxes used to change the rotational speed of a propeller relative to the output drive shaft of an airboat engine.

BACKGROUND

Airboats are boats that are designed to be used in shallow water and on dry ground where conventional boats with outboard engines are unable to run. Airboats are powered by engine setups that do not have any aspect extending into the water. Airboats today are powered by engines that have carbon fiber propellers attached thereto. Many times, performance of the boat is enhanced by installing a gearbox between the airboat engine and the propeller to change the rotational speed, revolutions per minute, (RPM) of propeller relative to the rotational speed of a crank of an engine. Without a gearbox, support structure of a gearbox is attached directly to a crank of an engine resulting in a one to one ratio of rotational speed of the gearbox relative to the rotational speed of the propeller. Operating efficiency of an airboat is improved when a gearbox is positioned between the engine and the propeller to change the rotational speed of the propeller relative to the rotational speed of the engine.

While use of a gearbox is helpful for changing the rotational speed of the propeller relative to the rotational speed of the engine, use of gearbox introduces other challenges that must be overcome. Gearboxes add weight to the airboat, which is undesirable as the lighter an airboat is, the better the airboat operates. Also, gearboxes add noise to the operation of the airboat. Additionally, gearboxes are subject to damage from vibrations, and axial movement of a crank of an engine, thereby shortening the useful life of the gearbox.

SUMMARY OF THE INVENTION

A gearbox dampening system configured to absorb axial movement of the crank of the airboat engine to reduce damage causing vibration and noise is disclosed. The gearbox dampening system enables a gearbox to be releasably coupled to outer support structures of an engine to support the gearbox and enables one or more gears of the gearbox to be in communication with a crank of an airboat engine via one or more dampeners. In at least one embodiment, the one or more dampeners significantly reduces stresses imparted on the gears of the gearbox via axial movement of the crank of the engine created when the engine is running. In particular, axial movement of the crank of the engine, which would usually create noise, chatter and engine damage, is absorbed by the one or more dampeners positioned between the crank and the one or more gears in the gearbox supporting an airboat propeller.

The gearbox dampening system may include one or more drive plates and one or more dampeners releasably attachable to the drive plate and configured to transmit rotary motion from an airboat engine to one or more gears in a gearbox without the gear being in rigid contact with a crank of the airboat engine. The dampener may include one or more flex plate stud receivers configured to receive a flex plate stud extending from one or more supports in connection with the crank of the airboat engine. The dampener may be configured to absorb axial movement of the crank of the airboat engine thereby permitting the axial movement of the crank of the airboat engine without creating necessitating axial movement in the gear in the gearbox.

In at least one embodiment, the drive plate is configured to enable rotary motion to be transferred from a crank of an airboat engine to one or more gears within a gear box. In at least one embodiment, the drive plate may be attachable to one or more gears within a gear box. The drive plate may include gearbox attachment holes. The drive plate may be a cylindrical plate with a plurality of dampener receiving holes. The dampener receiving holes may be equally spaced from each other and equally spaced from a center of the drive plate. The dampener receiving holes may extend completely through the drive plate. The drive plate includes a plurality of dampener receiving holes, and in at least one embodiment, may include six dampener receiving holes. In at least one embodiment, the dampener receiving holes may have equal diameters. In at least one embodiment, the support in connection with the crank of the airboat engine is one or more flex plates in communication with the crank of the airboat engine. The flex plate may include one or more ring gears configured to be releasably engaged by a starter motor.

The dampener may be configured in any appropriate configuration enabling rotary motion to be transferred from a crank of an airboat engine to one or more gears of a gearbox while absorbing forces created from harmonic vibrations from the crank and other components of an engine and lateral movement of the crank. In at least one embodiment, the dampener may be formed from one or more sleeves defining the flex plate stud receiver and one or mor axial force absorbers attached to the sleeve. In at least one embodiment, the axial force absorber may be one or more flanges. A thickness of the flange in a direction aligned with a longitudinal axis of the dampener may be greater than a maximum possible distance of travel of a crank of the airboat engine axially along a longitudinal axis of the crank. In at least one embodiment, the flange may be, but is not limited to being, cylindrical. The flange may have an outer diameter larger than a diameter of a dampener receiving hole in the drive plate. The flange may be, but is not limited to being, positioned at a distal end of the sleeve. In at least one embodiment, the sleeve may be cylindrical and configured to be received within a cylindrical dampener receiving hole in the at least one drive plate such that the at least one sleeve is free to rotate within the dampener receiving hole enabling the at least one dampener to prevent buildup of stress within the at least one dampener.

During use, one or more gears in the gearbox are in communication with the crank of the airboat engine, but are only in communication with the crank through the gearbox dampening system. As such, when the engine is running, rotary motion is transmitted from the crank of the airboat engine to the gearbox through the gearbox dampening system. The gearbox dampening system, via the one or more dampeners, transmits rotary motion and rotational forces from a crank of an engine to a drive shaft of a gearbox and absorbs vibrations created when the engine is running. The gearbox dampening system 10 also absorbs lateral movement by the crank of an engine, thereby preventing the crank or the flex plate from directly contacting the drive plate, the drive shaft of the gearbox, or one or more gears in the gearbox. As such, operating the engine with a propeller attached thereto together with the gearbox dampening system is quieter than without use of the gearbox dampening system. Use of the gearbox dampening system not only reduces the sound generated by the engine, propeller and gearbox during use but also reduces damage to the engine and gearbox caused by vibrations and axial movement of the crank generated during operation of the engine.

An advantage of the gearbox dampening system is that the gearbox dampening system reduces destructive and damaging vibrations and axial movement of a crank of engine caused by running the engine.

Another advantage of the gearbox dampening system is that the gearbox dampening system eliminates rigid contact between the crank and a gear box drive shaft.

Yet another advantage of the gearbox dampening system is that the gearbox dampening system increases the useful life of the gearbox, engine and other components on an airboat.

Another advantage of the gearbox dampening system is that the gearbox dampening system includes a flex plate stud management system that enables each flex plate stud to be independently positionable so that the flex plate studs accurately match up with the dampeners in the drive plate.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
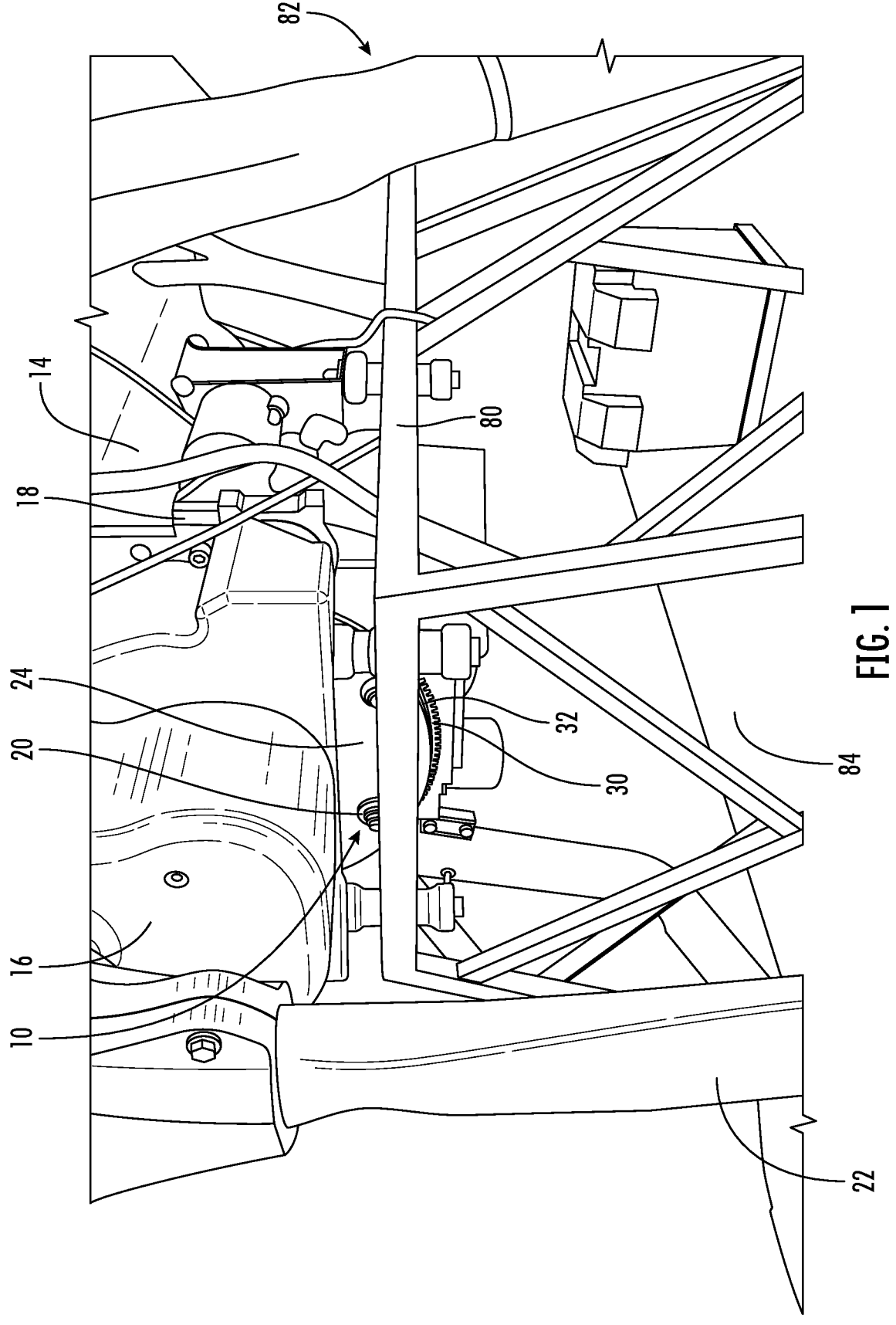
FIG. 1 is a perspective view of a gearbox dampening system installed on an airboat between the engine and the gearbox.
Figure 2:
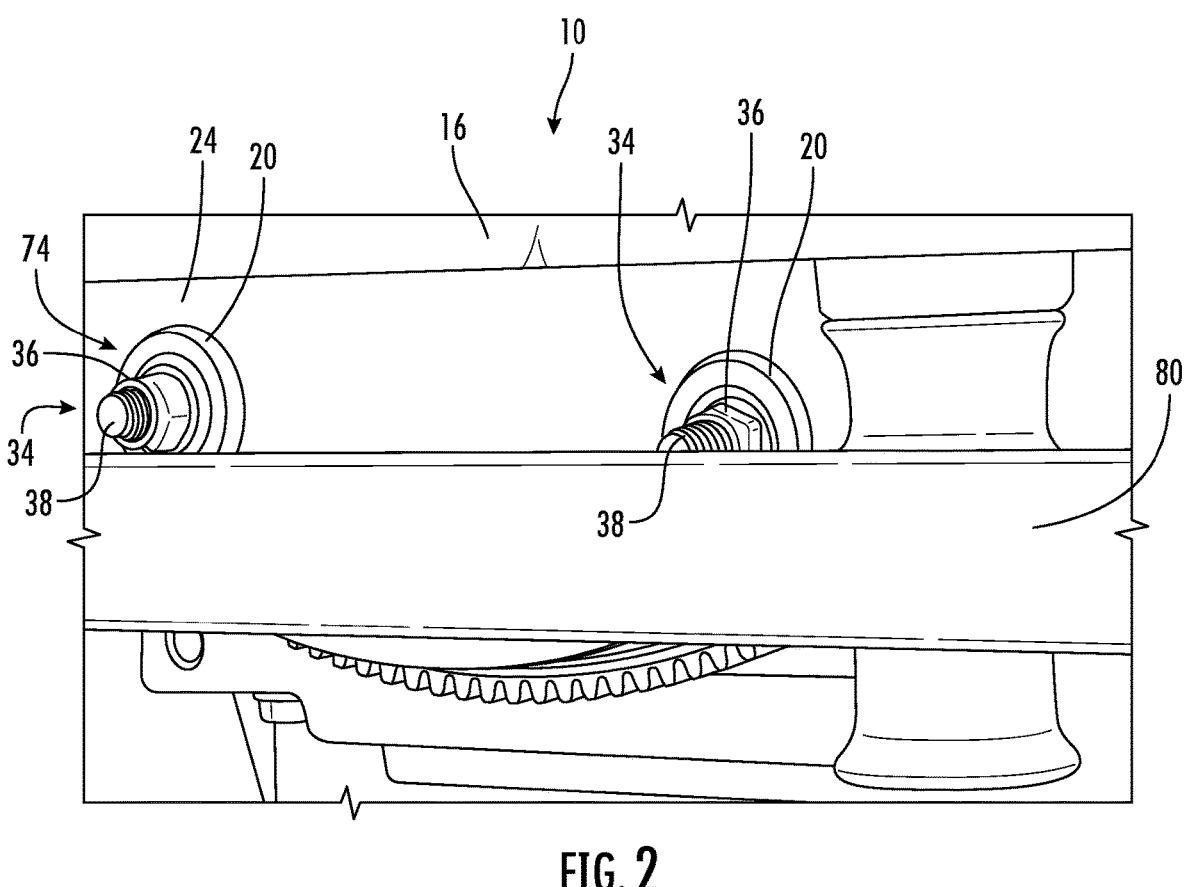
FIG. 2 is a perspective view of a portion of the gearbox dampening system installed on an airboat between the engine and the gearbox.
Figure 3:
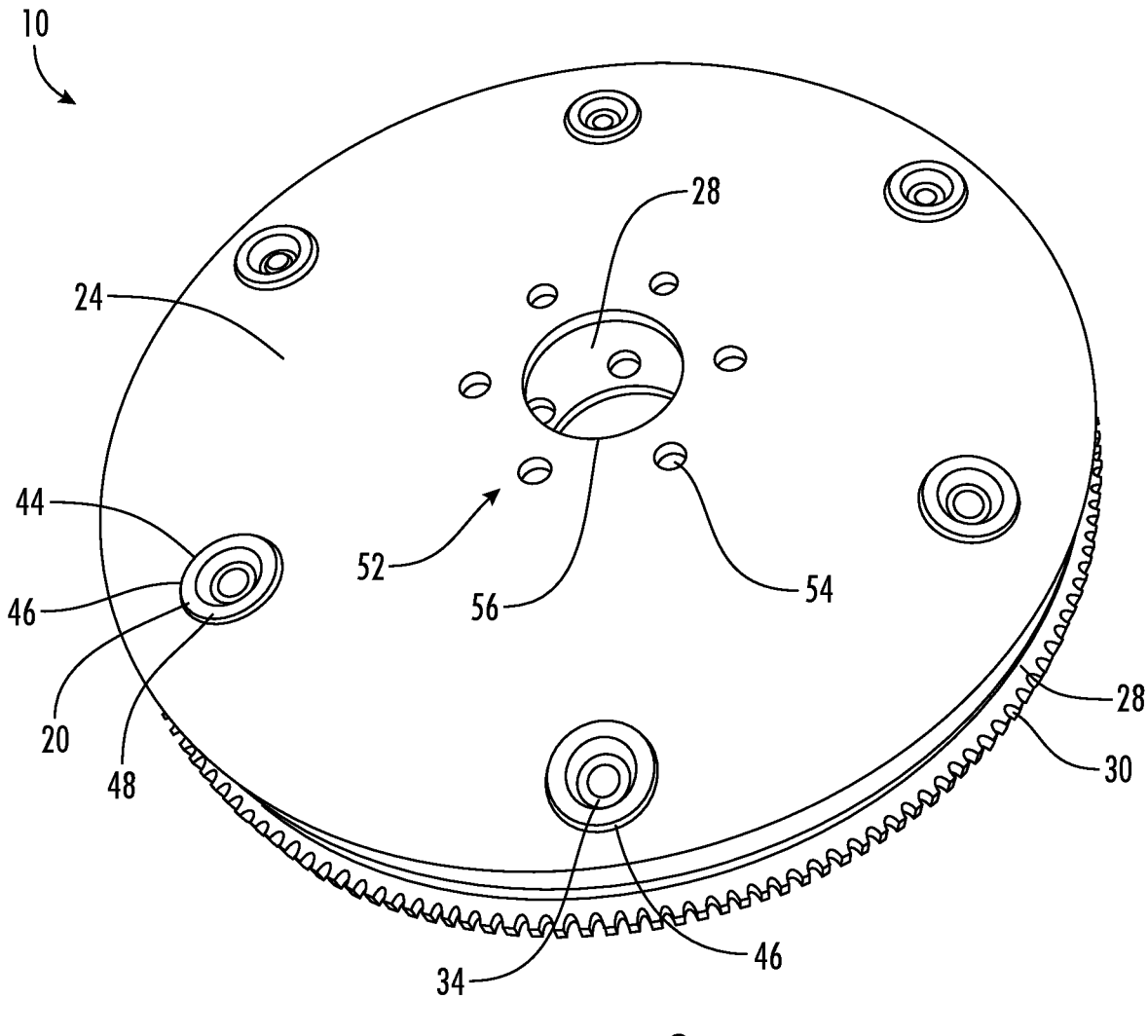
FIG. 3 is a perspective view of a drive plate of the gearbox dampening system with dampeners receiving flex plate studs.
Figure 4:
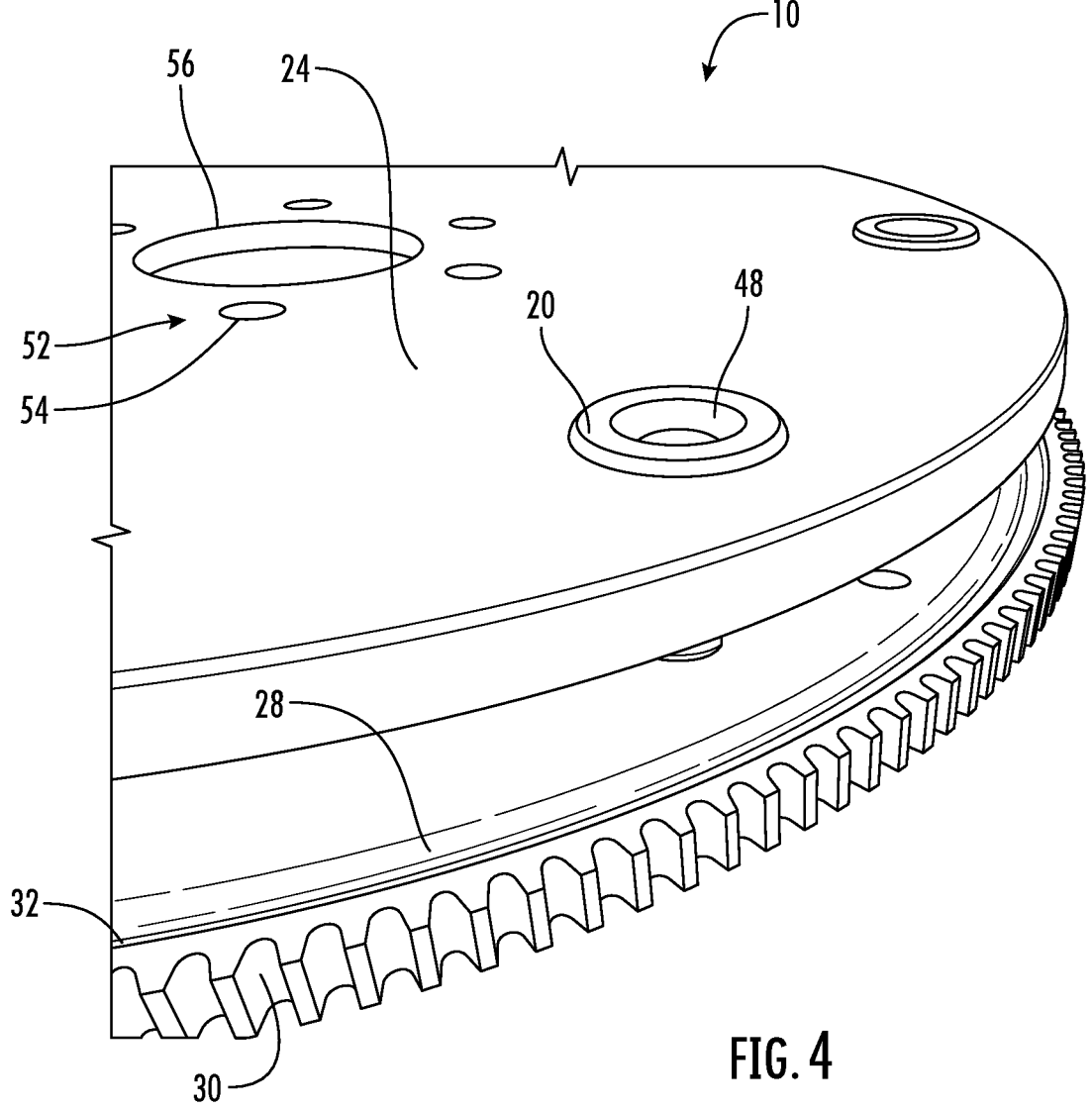
FIG. 4 is a perspective view of a drive plate of the gearbox dampening system with dampeners receiving flex plate studs extending from a flex plate that is rigidly attached to a crank of an engine.
Figure 5:
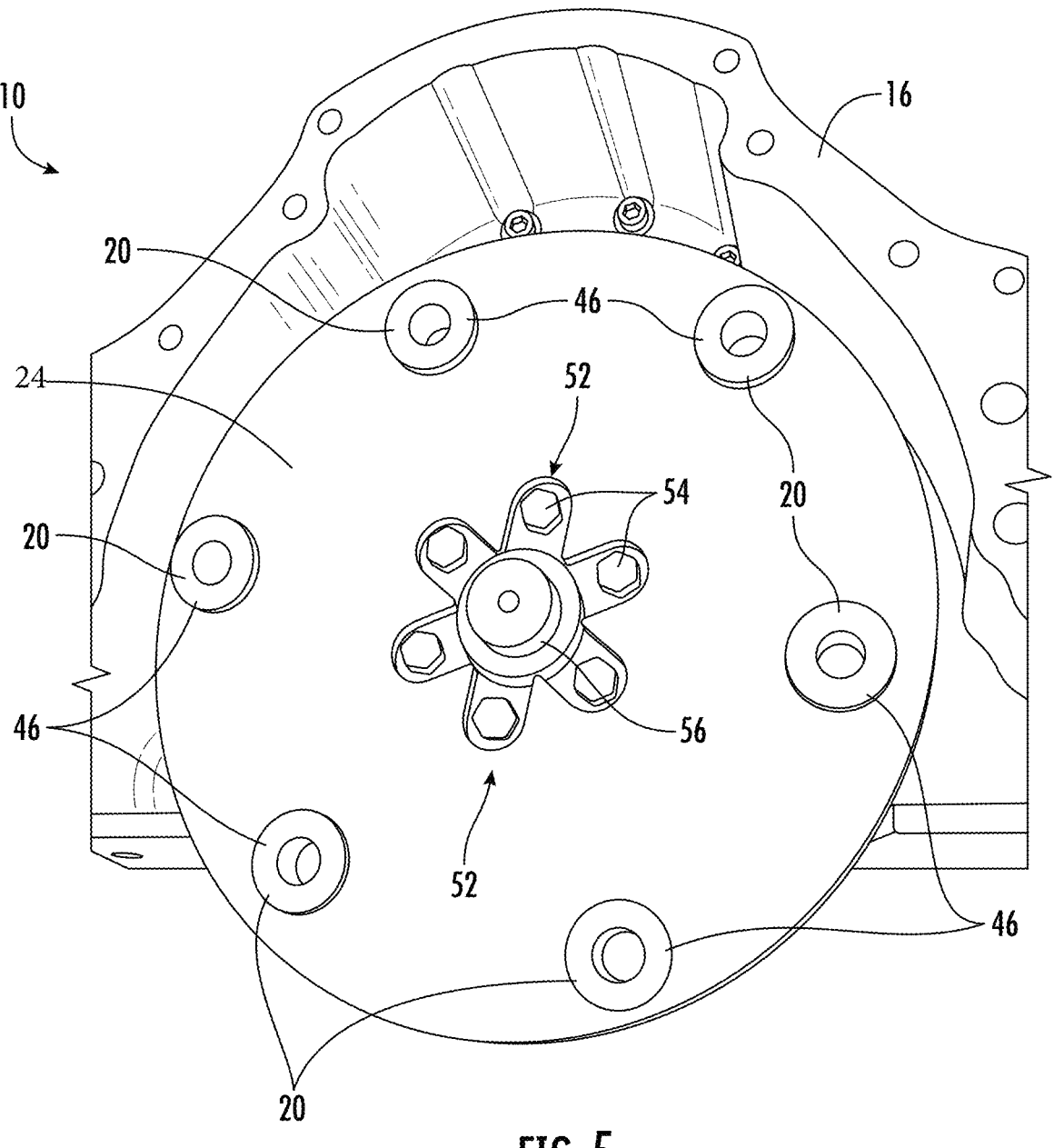
FIG. 5 is a perspective view of a drive plate of the gearbox dampening system attached to the drive shaft of a gearbox.
Figure 6:
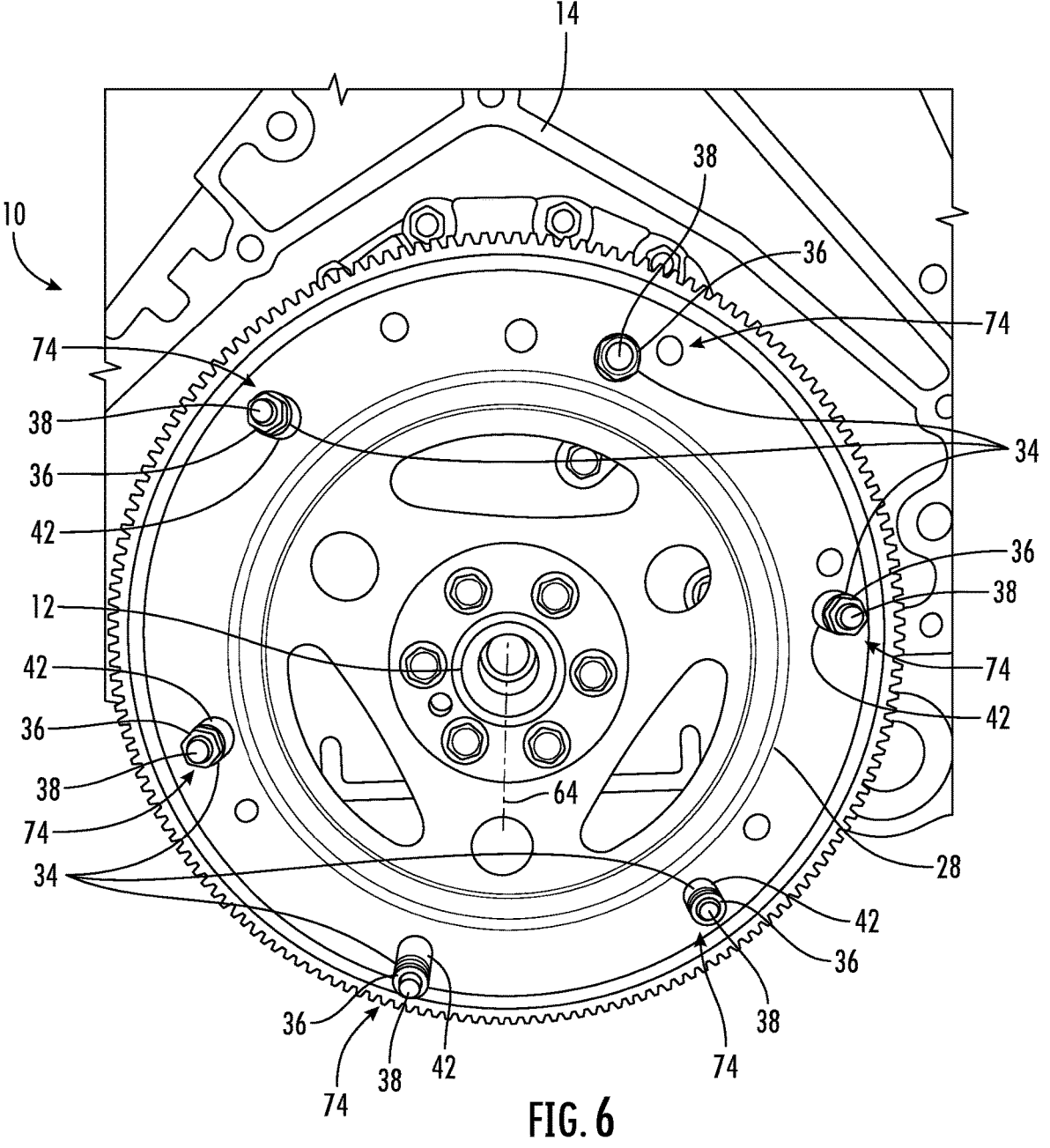
FIG. 6 is a perspective view of a flex plate attached to a crank of an engine, whereby the flex plate includes flex plate studs configured to be received within the dampeners on the drive plate.
Figure 7:
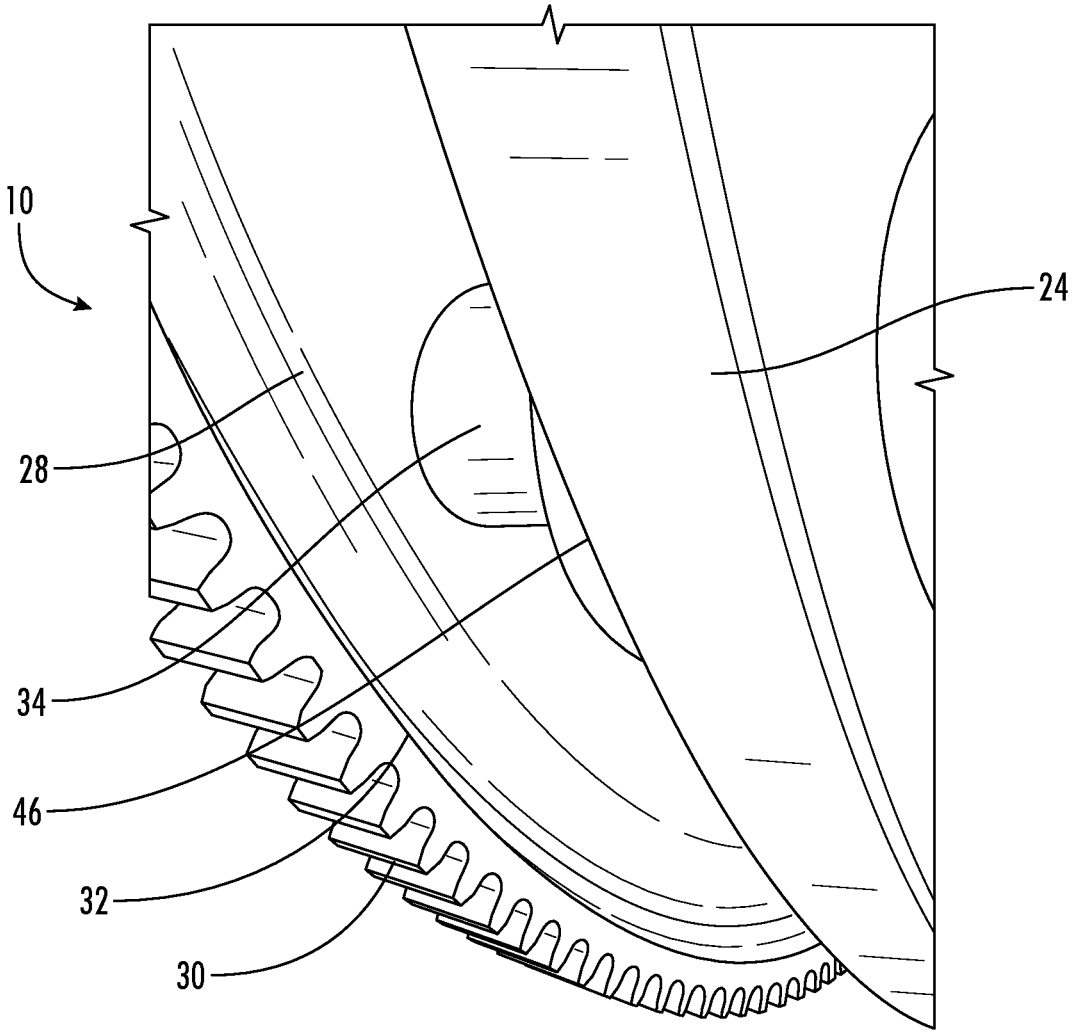
FIG. 7 is a close-up perspective view of the drive plate in position adjacent to the flex plate with the flex plate studs received within the dampeners held in position in holes in the drive plate.

As shown in FIGS. 1-15, a gearbox dampening system 10 configured to absorb axial movement of a crank 12 of the airboat engine 14 to reduce damage causing vibration and noise is disclosed. The gearbox dampening system 10 greatly reduces harmonic vibration created within the engine 14 and propeller 22, thereby reducing noise and reducing damage to the engine 14, a motor stand 80 to which the engine 14 is mounted, an airboat 82, and an airboat hull 84 to which the motor stand 80 is mounted. The gearbox dampening system 10 enables a gearbox 16 to be releasably coupled to outer support structures 18 of an engine 14 to support the gearbox 16 and enables one or more gears of the gearbox 16 to be in communication with a crank 12 of an airboat engine 14 via one or more dampeners 20. In at least one embodiment, the one or more dampeners 20 significantly reduces stresses imparted on the gears of the gearbox 16 via axial movement of the crank 12 of the engine 14 created when the engine 14 is running. In particular, axial movement of the crank 12 of the engine 14, which would usually create noise, chatter and engine damage, is absorbed by the one or more dampeners 20 positioned between the crank 12 and the one or more gears in the gearbox 16 supporting an airboat propeller 22. The gearbox dampening system 10 provides a dampener 20 between the crank 12 of the engine 14 and the gears within the gearbox 16. The gearbox dampening system 10 may be used in conjunction with any airboat engine 14, any motor stand 80 to which the engine 14 is mounted, any airboat hull 84 to which the motor stand 80 is mounted and any airboat 82 with modifications to gearbox dampening system 10 for different sizes and specifications.

As shown in FIGS. 1-14, the gearbox dampening system 10 may include one or more drive plates 24 and one or more dampeners 20 releasably attachable to the drive plate 24 and configured to transmit rotary motion from an airboat engine 14 to one or more gears in a gearbox 16 without the gear being in rigid contact with a crank 12 of the airboat engine 14. The dampener 20 may be configured in any appropriate configuration enabling rotary motion to be transferred from a crank 12 of an airboat engine 14 to one or more gears of a gearbox 16 while absorbing forces created from harmonic vibrations from the crank 12 and other components of an engine 14 and absorbing forces generated by lateral movement of the crank 12. In doing so, the dampener 20 is also configured to absorb axial movement of the crank 12 of the airboat engine 14 thereby permitting the axial movement of the crank 12 of the airboat engine 14 without necessitating axial movement of the gear in the gearbox 16.

In at least one embodiment, as shown in FIGS. 2-5, 10, 11, 13 and 14, the gearbox dampening system 10 may include one or more dampeners 20 configured to be positioned in the dampener receiving holes 44 in the drive plate 24. The dampeners 20 may have any configuration sufficient to provide dampening action between the gearbox 16 and the crank 12 of the engine 14. The dampener 20 may be formed from one or more sleeves 48 defining a flex plate stud receiver 50 and one or more axial force absorbers 46 attached to the sleeve 48. The sleeve 48 may have any shape and dimensions capable of effectively transmitting rotary motion between the crank 12 and the one or more gears in a gearbox 16. In at least one embodiment, the sleeve 48 may be cylindrical and configured to be received within a generally cylindrical dampener receiving hole 44 in the drive plate 24 such that the sleeve 48 is free to rotate within the dampener receiving hole 44 enabling the dampener 20 to prevent buildup of stress within the dampener 20. The dampener 20 may include one or more flex plate stud receivers 50 configured to receive a flex plate stud 34 extending from one or more supports 28 in connection with the crank 12 of the airboat engine 14. The flex plate stud receiver 50 may extend from one end 66 of the sleeve 48 to the other end 68 of the sleeve 48 forming a first opening 70 at the one end 66 of the sleeve 48 and a second opening 72 at the other end 68 of the sleeve 48.

The gearbox dampening system 10 may be configured to include a flex plate stud management system 74 that enables a drive plate 24 to be releasably attached via a plurality of dampeners 20 to a flex plate 28 even if the flex plate studs 34 extending therefrom are not aligned. In particular, the flex plate stud management system 74 enables the flex plate studs 34 to be properly aligned with the flex plate stud receivers 50 and to account for machining errors, manufacturing issues and other production problems. The flex plate stud management system 74 enables the flex plate studs 34 to be movable relative to the flex plate 28. In particular, the nuts 36 on the bolts 38 that secure the sleeves 42 forming the flex plate studs 34 are capable of being loosened to enable the flex plate studs 34 to be properly positioned and then tightened when in place in flex plate stud receivers 50 of the dampeners 20 while in the drive plate 24. As such, the nuts 36 of the flex plate studs 34 are loose when a gearbox 16 with drive plate 24 is moved into position to attach the gearbox housing to the engine 14 and slip the flex plate studs 34 into the flex plate stud receivers 50 in the dampeners 20. The holes 40 in the flex plate 28 may be larger than the diameters of the bolts 38 to enable the bolts 38 to be moved within the holes 40. The diameters of a flex plate stud receiver 50 may be such that when the dampener 20 is installed in the drive plate 24 and the flex plate stud 34 is positioned in a flex plate stud receiver 50 in the damper 20 on the drive plate 24, a socket can be inserted into the flex plate stud receiver 50 to engage the nut 36 and tighten the nut in position. Then, if the gearbox 16 needs to be removed for service or otherwise, the flex plate studs 34 are all properly positioned enabling fast and easy alignment with the dampers 20 on the drive plate 24 when the gearbox 16 is reattached to the engine 14.

Figure 13:
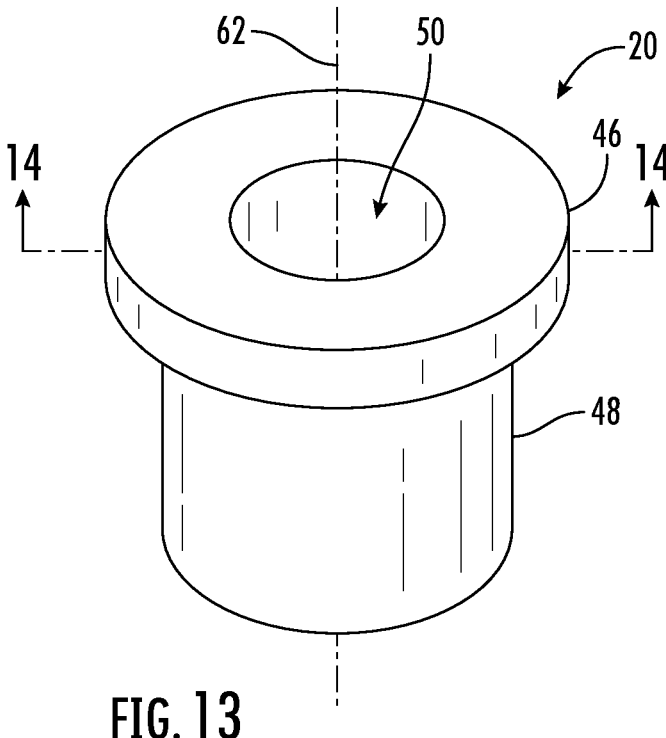
FIG. 13 is a perspective view of a dampener.
Figure 14:
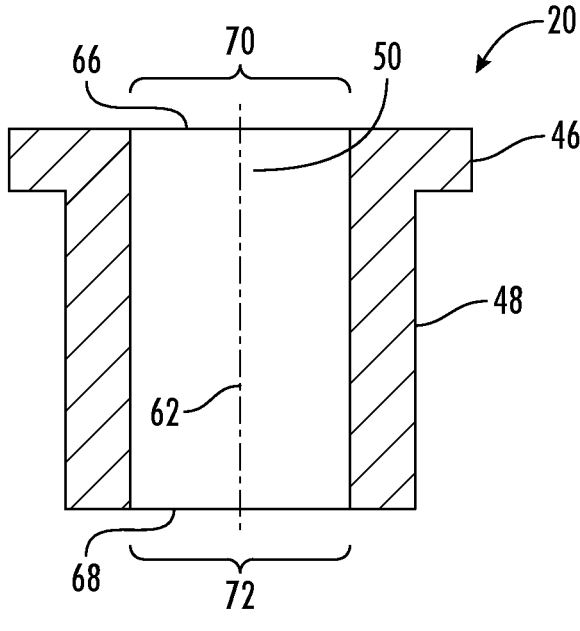
FIG. 14 is a cross-sectional view of the dampener taken at Section 14-14 in FIG. 13.
Figure 15:
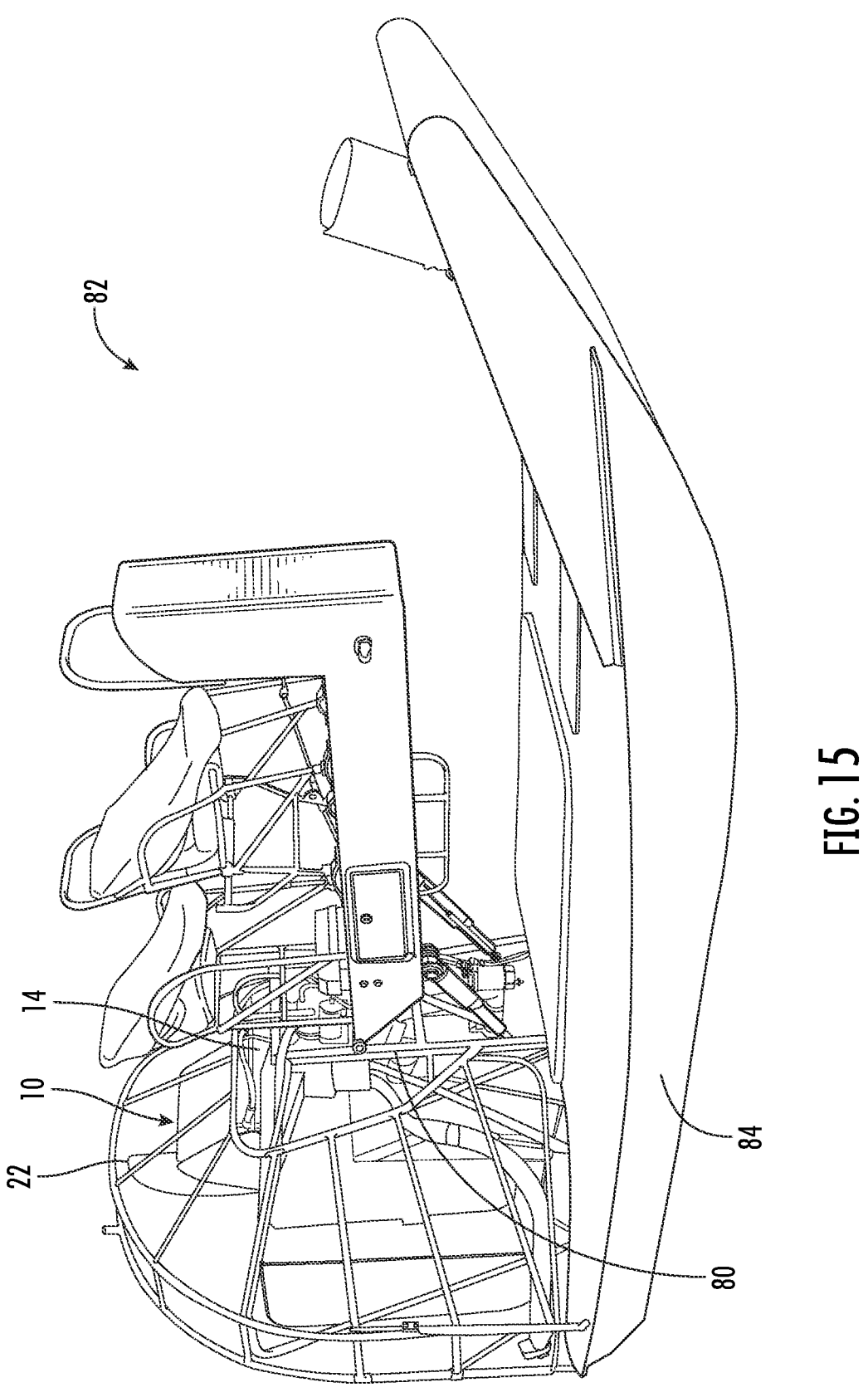
FIG. 15 is a perspective view of an airboat with a gearbox dampening system installed thereon.

The axial force absorber 46, as shown in FIGS. 13 and 14, may be configured to absorb axial forces transmitted from the crank 12. In at least one embodiment, the axial force absorber 46 may be, but is not limited to being, one or more flanges 46. A thickness of the flange 46 in a direction aligned with a longitudinal axis 62 of the dampener 20 may be greater than a maximum possible distance of travel of a crank 12 of the airboat engine 14 axially along a longitudinal axis 64 of the crank 12. In at least one embodiment, the flange 46 may be, but is not limited to being, cylindrical. The flange 46 may have an outer diameter larger than a diameter of a dampener receiving hole 44 in the drive plate 24. The radially outer dimension of the flange 46 may be larger than the diameter of the dampener receiving hole 44 and configured to prevent the sleeve 42 of the dampener 20 from sliding through the dampener receiving hole 44 in the drive plate 24 and to prevent the drive plate 24 from contacting the flex plate 28. The flange 46 may be, but is not limited to being, positioned at a distal end of the sleeve 48. The axial force absorber 46 may be formed from a material that is same as a material used to form the sleeve 48. In another embodiment, the axial force absorber 46 may be formed from a different material than is used to form the sleeve 48. The dampener 20 may be formed from any material capable of withstanding the forces generated between the crank 12 and the propeller 22 coupled to the gearbox 16. The dampener 20 may be, but is not limited to being, formed from one or more elastic polymers (rubber), such as, but not limited to, urethane elastomers, that is flexible with a high load bearing capacity.

The gearbox dampening system 10 may be formed from a drive plate 24 configured to transmit rotary motion and rotational forces from a crank 12 of an engine 14 to a drive shaft 26 of a gearbox 16. The gearbox dampening system 10 may include a drive plate 24 that is in communication with the crank 12 via one or more dampeners 20. The drive plate 24 may be movably attached to the crank 12 of the engine 14. Such connection to the crank 12 may happen in more than one way. In at least one embodiment, a flex plate 28 may be coupled to the crank 12. The flex plate 28 may include teeth 30 extending radially outward from an outer surface 32 of the flex plate 28 forming a ring gear configured to be engaged by a starter motor 58 for starting the engine 14. The flex plate 28 may be coupled to the crank 12 of an engine 14 via one or more releasable connectors, such as six bolts shown in FIGS. 6, 9, 11 and 12. The flex plate 28 may include a plurality of flex plate studs 34 extending axially away from the flex plate 28 in a direction away from the engine 14. The flex plate 28 may include any desired number of flex plate studs 34, which, in at least one embodiment, is six flex plate studs 34. The flex plate stud 34 may be, but is not limited to being, a nut 36 threadably engaged to a bolt 38 extending through a hole 40 in the flex plate 28, whereby the nut 36 forcibly retains a sleeve 42 on the flex plate 28 between the nut 36 and the flex plate 28.

The drive plate 24 may have appropriate size and configuration. The drive plate 24 may be configured to have dampener receiving holes 44 that are aligned with the flex plate studs 34 extending from the flex plate 28. The dampener receiving holes 44 may be each be configured to receive a dampener 20, which in turn may be configured to receive a flex plate stud 34. As such, a dampener 20 may be positioned between each flex plate stud 34 and the drive plate 24. As such, the gears with the gearbox 16 are not directly attached to the crank 12 of the engine 14 or the flex plate 28. Rather, the dampeners 20 are positioned between the flex plate 28 and the components of the gearbox 16, such as the drive plate 24 and gears.

The drive plate 24 may have any appropriate. In at least one embodiment, the drive plate 24 may be generally cylindrical. The drive plate 24 may have any appropriate diameter. In at least one embodiment, the drive plate 24 may have an outer diameter approximately equal to an outer diameter of the flex plate 28. The drive plate 24 may have any appropriate thickness. In at least one embodiment, the drive plate 24 may be between one inch and one quarter inch.

The drive plate 24 may include a drive plate attachment system 52 configured to couple the drive plate 24 to the gearbox 16. In at least one embodiment, the drive plate attachment system 52 may be configured to include one or more holes 54 in the drive plate 24 configured to receive bolts that can be releasably attached to the drive shaft 26 of the gearbox 16. The center of the drive plate 24 may include a hole 56 for receiving an end of the gearbox drive shaft 26, but the end of the gearbox drive shaft 26 is not attached to the drive plate 24. Rather, the hole 56 in the drive plate 24 is larger than the gearbox drive shaft 26 and merely allows the gearbox drive shaft 26 to extend into or through the drive plate 24.

Figure 8:
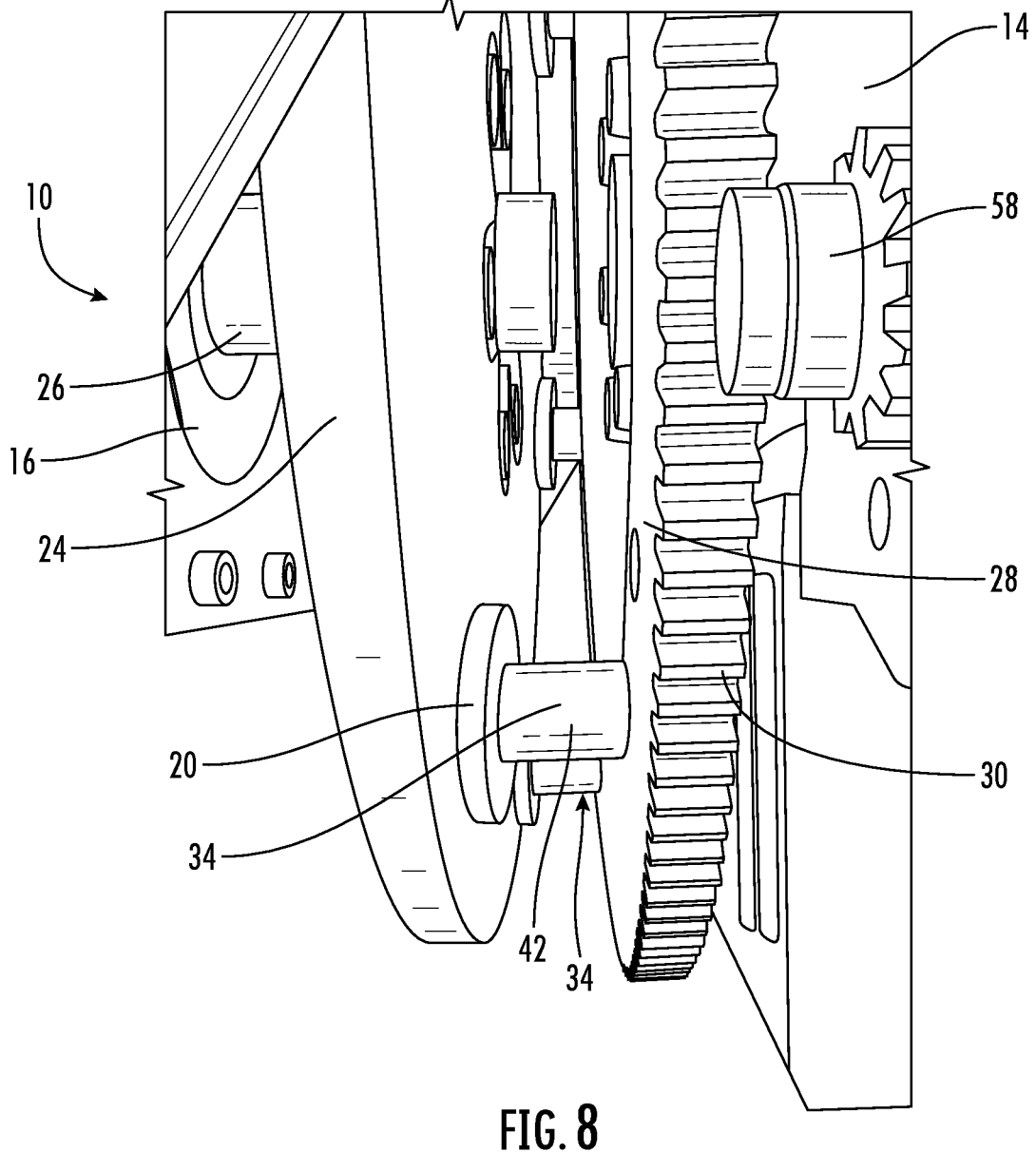
FIG. 8 is another close-up perspective view of the drive plate in position adjacent to the flex plate with the flex plate studs received within the dampeners held in position in holes in the drive plate.
Figure 9:
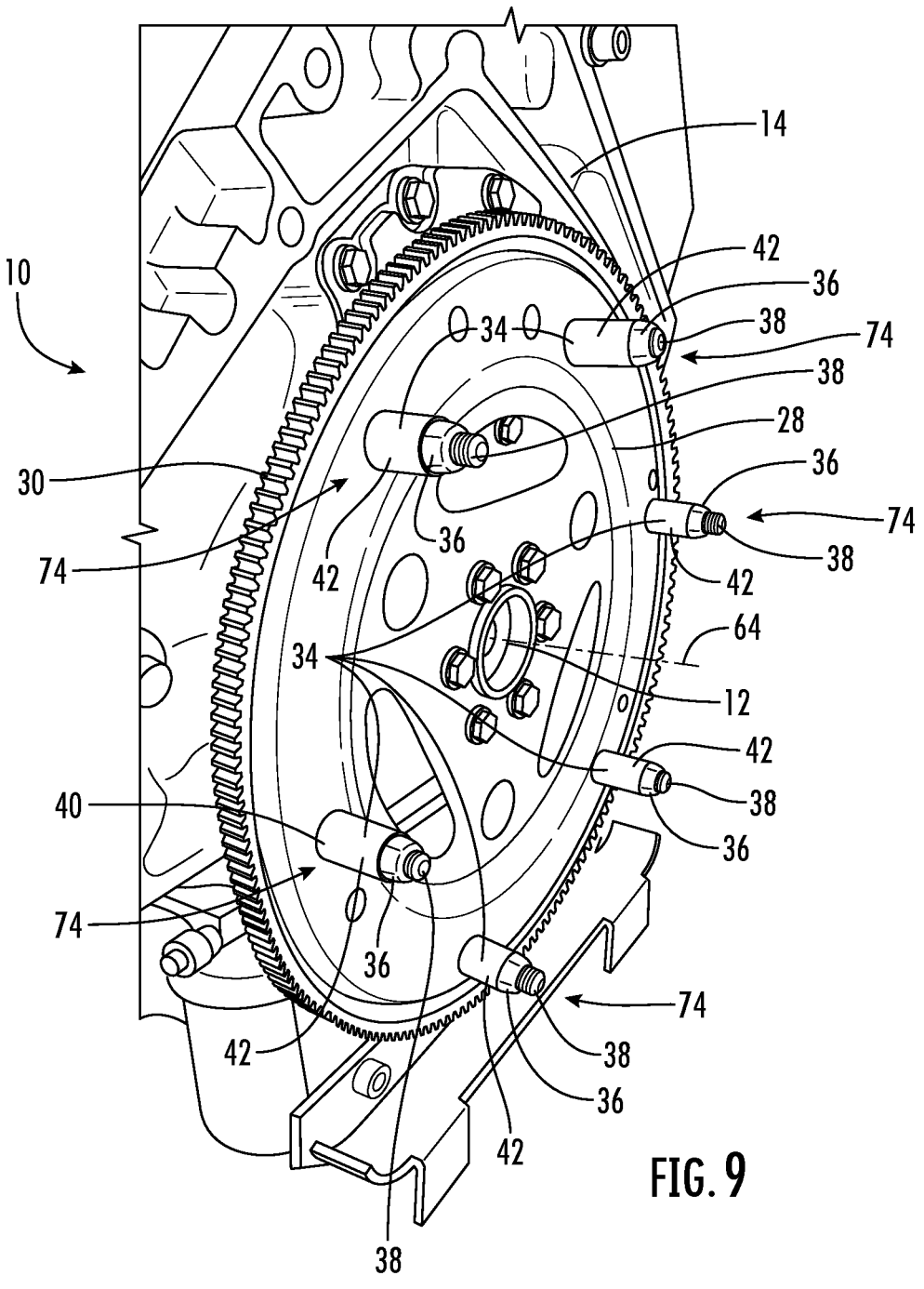
FIG. 9 is a perspective view of a flex plate attached to a crank of an engine, whereby the flex plate includes flex plate studs configured to be received within the dampeners on the drive plate.
Figure 10:
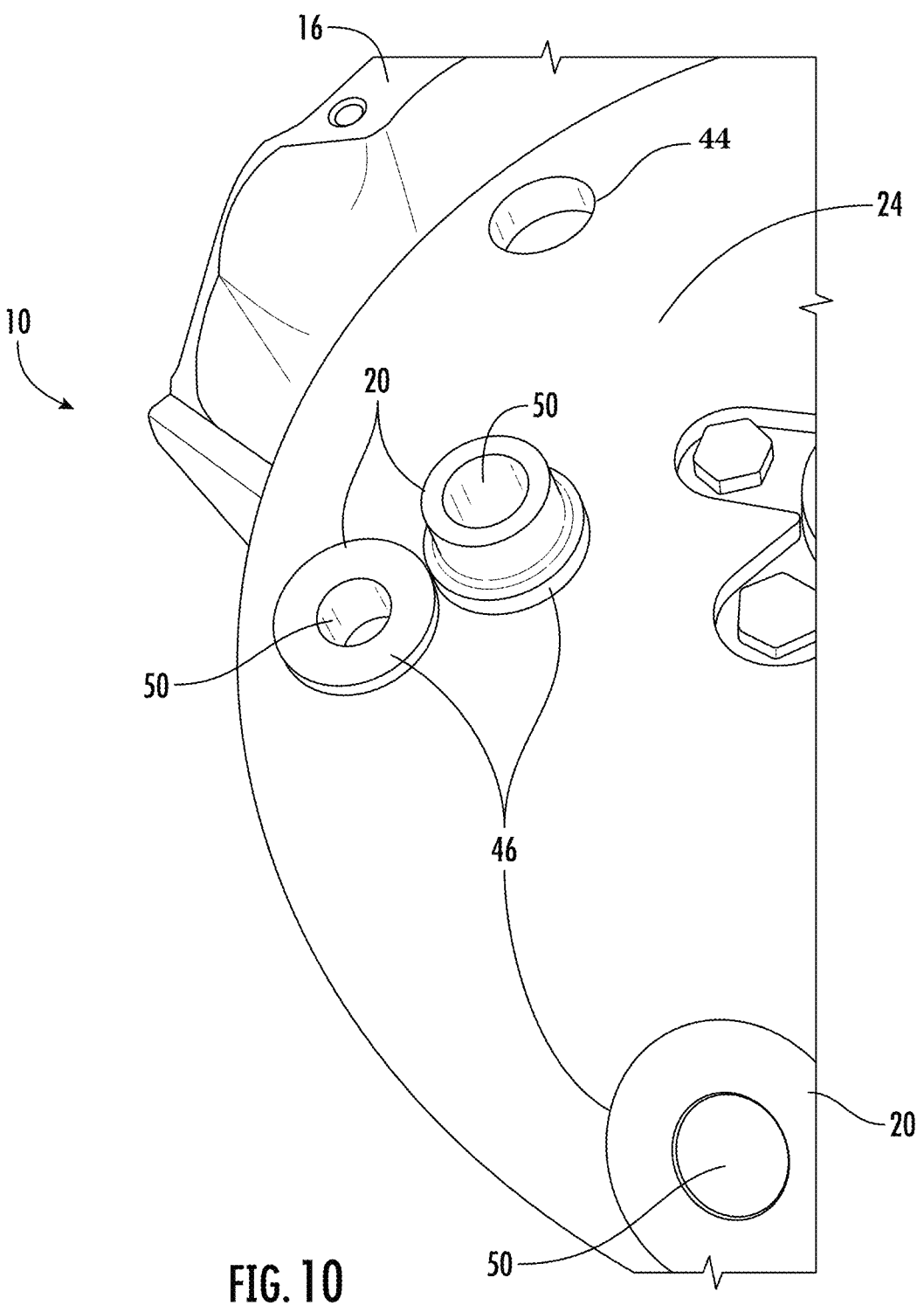
FIG. 10 is a perspective view of the drive plate with dampeners installed and a single dampener uninstalled and resting on the drive plate.
Figure 11:
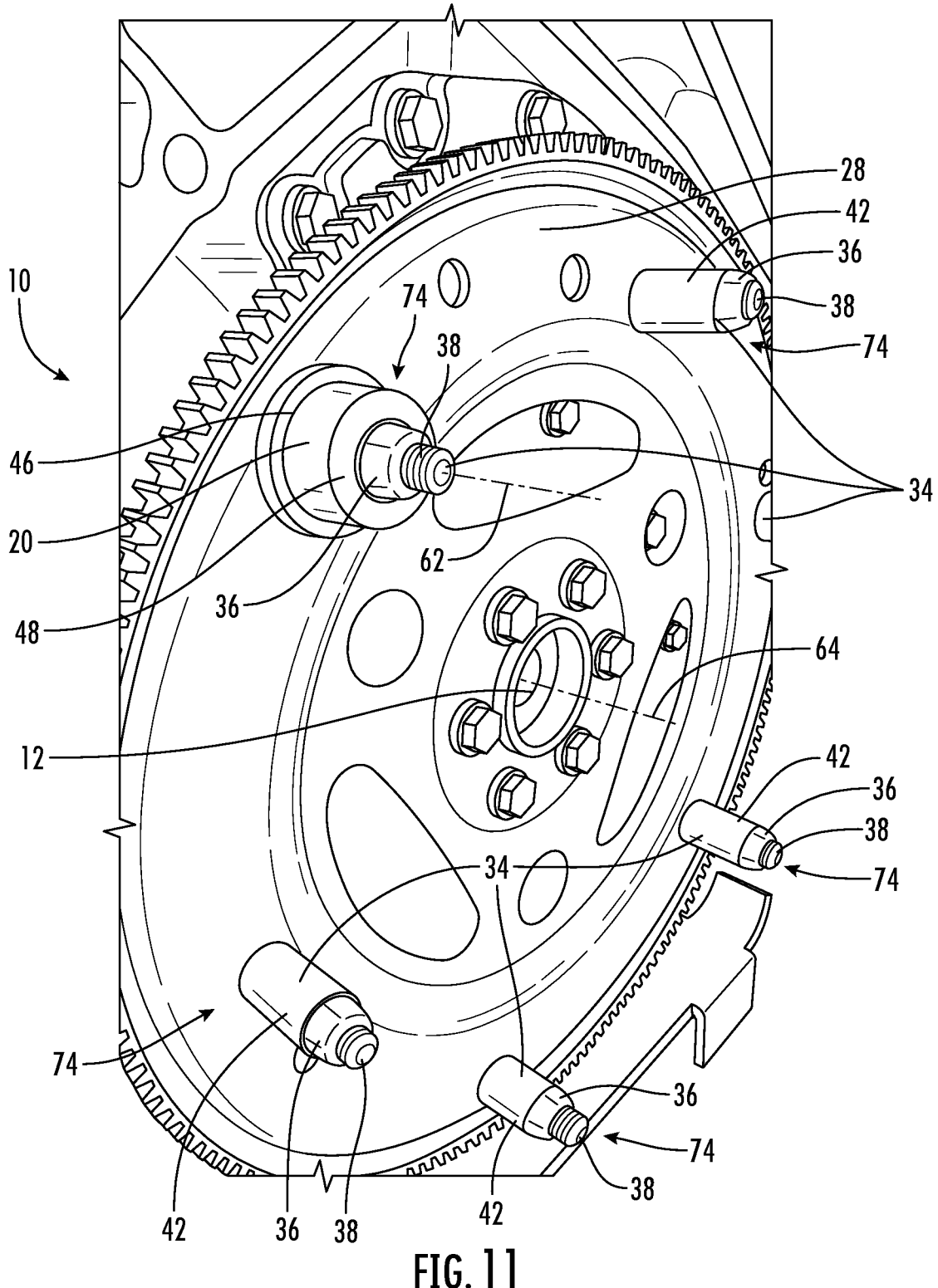
FIG. 11 is a perspective view of a flex plate attached to a crank of an engine with a dampener positioned on a flex plate stud.
Figure 12:
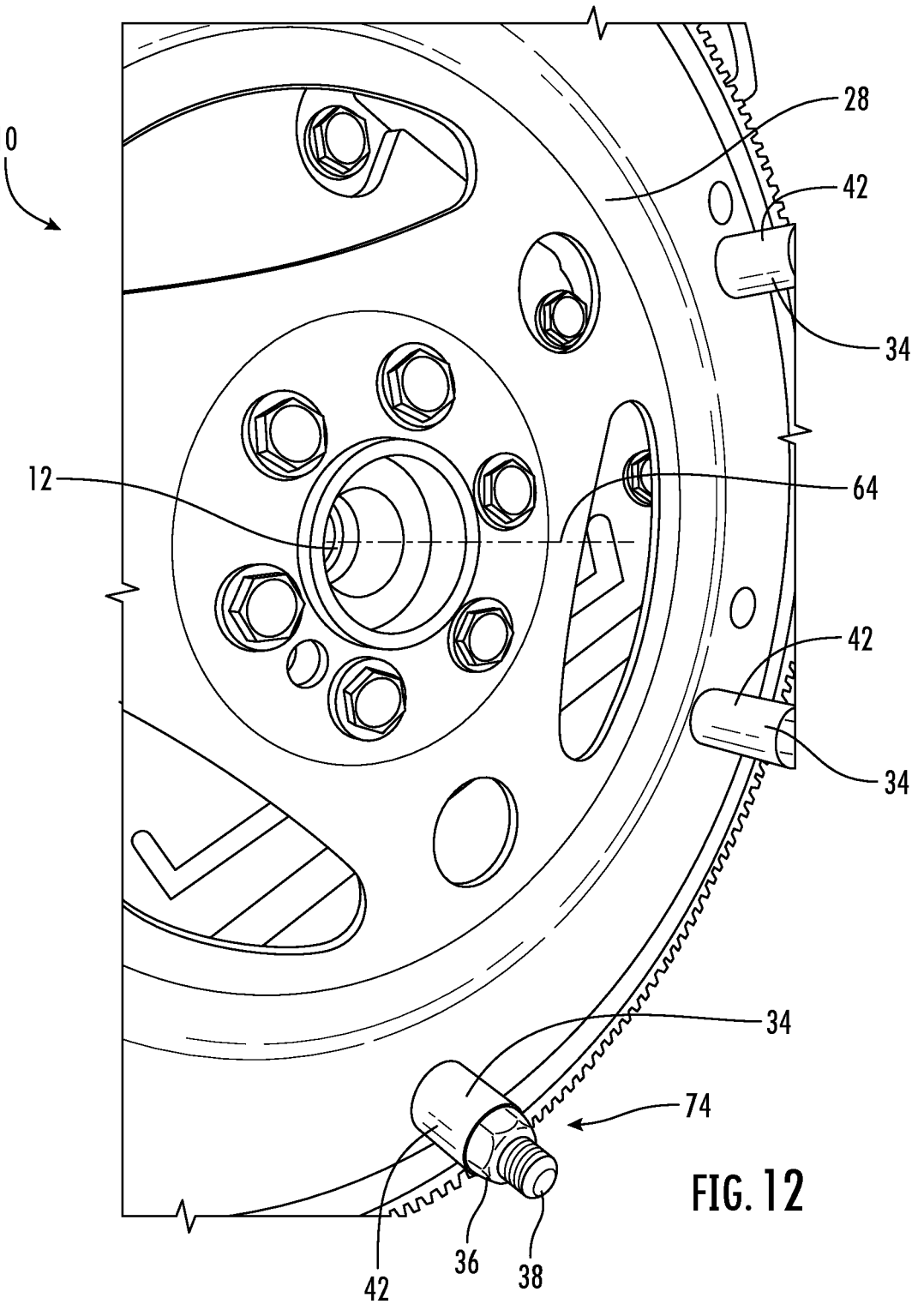
FIG. 12 is a perspective view of a flex plate attached to a crank of an engine, whereby the flex plate includes flex plate studs configured to be received within the dampeners on the drive plate.

The gearbox dampening system 10 may be assembled by drilling holes in the flex plate 28 and installing the flex plate studs 34 in the flex plate 28 so that the flex plate studs 34 extend axially from the drive plate 24. The flex plate 28 may be attached to the crank 12 of the engine 14 such that the flex plate studs 34 extend axially away from the engine 14. The drive plate 24 may be attached to the drive shaft 26 of the gearbox 16. The gearbox 16 together with the drive plate 24 may be lifted into place whereby the dampeners 20 are positioned in the dampener receiving holes 44 in the drive plate 24. The gearbox 16 is lifted into place, and the dampeners 20 are aligned with the flex plate studs 34 and the gearbox 16 and drive plate 24 are pushed towards the engine 14 such that the flex plate studs 34 are inserted into the dampeners 20. The gearbox 16 is kept in this position by attaching the gearbox 16 to the engine block or other supporting structure 18 via one or more releasable connectors, such as, but not limited to, bolts. Such configuration enables the flex plate 28, which is attached directly to the engine crank 12, to move axially (laterally) without imparting the axial movement to the gearbox 16. Rather, axial movement of the engine crank 12 and flex plate 28 in the directions shown at in FIG. 8 are absorbed by the dampeners 20 on the drive plate 24. In addition, the dampeners 20 absorb vibration which reduces noise and chatter at all ranges of speed.

During use, one or more gears in the gearbox 16 are in communication with the crank 12 of the airboat engine 14, but are only in communication with the crank 12 through the gearbox dampening system 10. As such, when the engine 14 is running, rotary motion is transmitted from the crank 12 of the airboat engine 14 to the gearbox 16 through the gearbox dampening system 10. The gearbox dampening system 10, via the one or more dampeners 20, transmits rotary motion and rotational forces from a crank 12 of an engine 14 to a drive shaft 26 of a gearbox 16 and absorbs vibrations created when the engine 14 is running. The gearbox dampening system 10 also absorbs lateral movement by the crank 12 of an engine 14, thereby preventing the crank 12 or the flex plate 28 from directly contacting the drive plate 24, the drive shaft 26 of the gearbox 16, or one or more gears in the gearbox 16. As such, operating the engine 14 with a propeller 22 attached thereto together with the gearbox dampening system 10 is quieter than without use of the gearbox dampening system 10. Use of the gearbox dampening system 10 not only reduces the sound generated by the engine 14, propeller 22 and gearbox 16 during use but also reduces damage to the engine 14 and gearbox 16 caused by vibrations and axial movement of the crank 12 generated during operation of the engine 14. During use, the gearbox dampening system 10 may be used on airboat engines 12 on airboats 82. The engine 12 to which the gearbox dampening system 10 is attached may be supported by a motor stand 80. The motor stand 80 may be configured to support the weight of the motor 12, gearbox 16, gearbox dampening system 10 and propeller 22 and to transfer the thrust created by the propeller 22 to the airboat hull 84. The motor stand 80 may be permanently or releasably attached to the airboat hull 84. The airboat hull 84 may be any airboat hull that is configured to support the motor stand 80 and engine 14.

The foregoing is provided for purposes of illustrating, explaining, and describing embodiments of this invention. Modifications and adaptations to these embodiments will be apparent to those skilled in the art and may be made without departing from the scope or spirit of this invention.

What is claimed is:

1. A gearbox dampening system, comprising:
at least one drive plate;
at least one dampener releasably attachable to the at least one drive plate and configured to transmit rotary motion from an airboat engine to at least one gear in a gearbox without the at least one gear being in rigid contact with a crank of the airboat engine;
wherein the at least one dampener comprises at least one flex plate stud receiver configured to receive a flex plate stud extending from at least one support in connection with the crank of the airboat engine; and
wherein the at least one dampener is configured to allow unrestrained axial movement of the crank of the airboat engine thereby permitting the axial movement of the crank of the airboat engine without creating necessitating axial movement in the at least one gear in the gearbox.

2. The gearbox dampening system of claim 1, wherein the at least one drive plate further comprises gearbox attachment holes.

3. The gearbox dampening system of claim 1, wherein the at least one drive plate is a cylindrical plate with a plurality of dampener receiving holes.

4. The gearbox dampening system of claim 3, wherein the dampener receiving holes are equally spaced from each other and equally spaced from a center of the at least one drive plate.

5. The gearbox dampening system of claim 3, wherein the dampener receiving holes have equal diameters.

6. The gearbox dampening system of claim 1, wherein the at least one support in connection with the crank of the airboat engine is at least one flex plate in communication with the crank of the airboat engine.

7. The gearbox dampening system of claim 6, wherein the at least one flex plate includes at least one ring gear configured to be releasably engaged by a starter motor.

8. The gearbox dampening system of claim 1, wherein the at least one dampener comprises at least one sleeve defining the at least one flex plate stud receiver and at least one axial force absorber attached to the at least one sleeve.

9. The gearbox dampening system of claim 8, wherein the at least one axial force absorber is at least one flange.

10. The gearbox dampening system of claim 9, wherein a thickness of the flange in a direction aligned with a longitudinal axis of the at least one dampener is greater than a maximum possible distance of travel of the crank of the airboat engine axially along a longitudinal axis of the crank.

11. The gearbox dampening system of claim 9, wherein the at least one flange has an outer diameter larger than a diameter of a dampener receiving hole in the at least one drive plate.

12. The gearbox dampening system of claim 11, wherein the at least one flange is positioned at a distal end of the at least one sleeve.

13. The gearbox dampening system of claim 8, wherein the at least one sleeve is cylindrical and configured to be received within a cylindrical dampener receiving hole in the at least one drive plate such that the at least one sleeve is free to rotate within the dampener receiving hole enabling the at least one dampener to prevent buildup of stress within the at least one dampener.

14. An airboat, comprising:

an airboat hull;

an airboat engine attached a motor stand attached to the airboat hull;

a gearbox dampening system coupled to the airboat engine, comprising:

at least one drive plate;

at least one dampener releasably attachable to the at least one drive plate and configured to transmit rotary motion from the airboat engine to at least one gear in a gearbox without the at least one gear being in rigid contact with a crank of the airboat engine;

wherein the at least one dampener comprises at least one flex plate stud receiver configured to receive a flex plate stud extending from at least one support in connection with the crank of the airboat engine; and wherein the at least one dampener is configured to allow unrestrained axial movement of the crank of the airboat engine thereby permitting the axial movement of the crank of the airboat engine without creating necessitating axial movement in the at least one gear in the gearbox.

15. The airboat of claim 14, wherein the at least one dampener comprises at least one sleeve defining the at least one flex plate stud receiver and at least one axial force absorber attached to the at least one sleeve.

16. The airboat of claim 15, wherein the at least one axial force absorber is at least one flange and wherein a thickness of the flange in a direction aligned with a longitudinal axis of the at least one dampener is greater than a maximum possible distance of travel of the crank of the airboat engine axially along a longitudinal axis of the crank.

17. The airboat of claim 16, wherein the at least one flange has an outer diameter larger than a diameter of a dampener receiving hole in the at least one drive plate.

18. An airboat engine, comprising:

the airboat engine is configured to be attached to a motor stand attachable to an airboat hull;

a gearbox dampening system coupled to the airboat engine, comprising:

at least one drive plate;

at least one dampener releasably attachable to the at least one drive plate and configured to transmit rotary motion from the airboat engine to at least one gear in a gearbox without the at least one gear being in rigid contact with a crank of the airboat engine;

wherein the at least one dampener comprises at least one flex plate stud receiver configured to receive a flex plate stud extending from at least one support in connection with the crank of the airboat engine;

wherein the at least one dampener is configured to allow unrestrained axial movement of the crank of the airboat engine thereby permitting the axial movement of the crank of the airboat engine without creating necessitating axial movement in the at least one gear in the gearbox.

19. The airboat engine of claim 18, wherein the at least one dampener comprises at least one sleeve defining the at least one flex plate stud receiver and at least one axial force absorber attached to the at least one sleeve.

20. The airboat engine of claim 19, wherein the at least one axial force absorber is at least one flange and wherein a thickness of the flange in a direction aligned with a longitudinal axis of the at least one dampener is greater than a maximum possible distance of travel of the crank of the airboat engine axially along a longitudinal axis of the crank, and wherein the at least one flange has an outer diameter larger than a diameter of a dampener receiving hole in the at least one drive plate.

* * * * *